(12) United States Patent
Funatsu et al.

(10) Patent No.: US 7,595,828 B2
(45) Date of Patent: Sep. 29, 2009

(54) SOLID-STATE IMAGE PICKUP DEVICE AND DRIVING METHOD THEREFOR

(75) Inventors: Eiichi Funatsu, Tokyo (JP); Keiji Mabuchi, Kanagawa (JP); Nobuo Nakamura, Kanagawa (JP); Takashi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 11/053,719

(22) Filed: Feb. 8, 2005

(65) Prior Publication Data
US 2005/0179795 A1 Aug. 18, 2005

(30) Foreign Application Priority Data
Feb. 13, 2004 (JP) ............................ P2004-036507

(51) Int. Cl.
H04N 3/14 (2006.01)
H04N 5/217 (2006.01)
H01L 31/062 (2006.01)
H01L 27/00 (2006.01)

(52) U.S. Cl. ..................... 348/302; 348/241; 257/291; 250/208.1

(58) Field of Classification Search ................. 348/302, 348/308, 241; 257/291, 292; 250/208.1
See application file for complete search history.

(56) References Cited

U.S. PATENT DOCUMENTS 5,790,191 A * 8/1998 Zhang ........................ 348/300
5,901,257 A 5/1999 Chen et al.
6,541,751 B1 * 4/2003 Bidermann ............... 250/208.1
6,650,369 B2 * 11/2003 Koizumi et al. ............. 348/301
6,765,613 B1 * 7/2004 Barna et al. ................. 348/241
6,801,255 B2 * 10/2004 Inui ............................ 348/241
7,068,312 B2 * 6/2006 Kakumoto et al. .......... 348/241
7,199,827 B2 * 4/2007 Inokuma et al. ............. 348/300
7,242,427 B2 * 7/2007 Kokubun et al. ............ 348/241
7,304,674 B2 * 12/2007 Mentzer et al. ............. 348/300
2002/0067416 A1 * 6/2002 Yoneda et al. ............... 348/304

FOREIGN PATENT DOCUMENTS

WO 02/43366 5/2002
WO WO 02/43366 5/2002

OTHER PUBLICATIONS

European Search Report dated Oct. 19, 2006.

* cited by examiner

*Primary Examiner*—Nhan T Tran
*Assistant Examiner*—Trung Diep
(74) *Attorney, Agent, or Firm*—Sonnenschein Nath & Rosenthal LLP (57) ABSTRACT

In a MOS solid-state image pickup device including two capacitors storing electric charges of pixels in two rows for each column and two charge-voltage conversion amplifiers for outputting pixel signals corresponding to the electric charges stored in the capacitors, a switch for selectively short-circuiting input terminals of the charge-voltage conversion amplifiers and a switch for short-circuiting output terminals of the charge-voltage amplifiers are provided. In a first driving mode, the switches are not short-circuited so that analog signals are read in the form of dual-rail outputs. In a second driving mode, the switches are short-circuited so that an average of the analog signals is read.

18 Claims, 7 Drawing Sheets

SOLID-STATE IMAGE PICKUP DEVICE AND DRIVING METHOD THEREFOR

BACKGROUND OF THE INVENTION

1. Field of the Invention

The present invention relates to solid-state image pickup devices and driving methods for solid-state image pickup devices, and more particularly, to horizontal-scanning solid-state image pickup devices and driving methods for horizontal-scanning solid-state image pickup devices.

2. Description of the Related Art

In camera modules, such as digital still cameras, using a solid-state image pickup device, for example, in contrast with a still image mode in which information of all pixels of the solid-state image pickup device is used, the resolution is reduced by adding pixel information or by skipping pixel information in a monitor mode in which an object is monitored. Accordingly, in a solid-state image pickup device for reading pixel information at a low resolution, pixel information of a plurality of pixels in the horizontal direction (lateral direction) in a horizontal signal line has been added by activating horizontal scanning pulses φH for a plurality of columns at the same time using a horizontal scanning circuit and by accessing the plurality of columns at the same time. (See, for example, Japanese Unexamined Patent Application Publication No. 11-146278.)

However, since the solid-state image pickup device according to the known example has an arrangement in which pixels in the horizontal direction are added, if this solid-state image pickup device is used as an image pickup device of a digital still camera, this arrangement cannot be applied to a monitor mode in which pixel addition in the vertical direction (longitudinal direction) is also required. In addition, since pixel information must be read for each row through a horizontal signal line, this arrangement cannot cope with an increase in the speed of reading all pixels in the still image mode.

SUMMARY OF THE INVENTION

Accordingly, it is an object of the present invention to provide a solid-state image pickup device capable of coping with an increase in the speed of reading information of all pixels and capable of adding pixels in the vertical direction with high accuracy; and a driving method for such a solid-state image pickup device.

In order to achieve the above object, a solid-state image pickup device according to the present invention includes a pixel array area in which pixels are two-dimensionally arranged in a matrix, the pixels each including a photoelectric conversion portion; a plurality of capacitors for storing electric charges of the pixels in a plurality of rows for each column, the electric charges being output from the pixel array area via a vertical signal line; a plurality of output circuits for outputting analog signals corresponding to the electric charges stored in the plurality of capacitors; and a switching unit for selectively short-circuiting input terminals of the plurality of output circuits. In the solid-state image pickup device, a first driving mode in which the switching unit is not short-circuited so that the analog signals are read independently from the plurality of output circuits and a second driving mode in which the switching unit is short-circuited so that an average of the analog signals is read from the plurality of output circuits are appropriately and selectively set.

In the solid-state image pickup device with the foregoing structure, in the first driving mode, since analog signals corresponding to electric charges stored in a plurality of capacitors are output through a plurality of output circuits independently, information of pixels in a plurality of rows can be read in parallel. Also, in the second driving mode, since input terminals of the plurality of output circuits are short-circuited, information of pixels in a plurality of rows is added for each pixel, and an average, that is, not merely a sum is read.

According to the present invention, in the first driving mode, since information of pixels in a plurality of rows can be read in parallel, this mode can cope with an increase in the speed of reading information of all pixels. In the second driving mode, since information of pixels in a plurality of rows is added for each pixel and an average is read, pixel addition in the vertical direction can be realized.

DESCRIPTION OF THE PREFERRED EMBODIMENTS

Embodiments of the present invention will be described with reference to the drawings.

Figure 1:
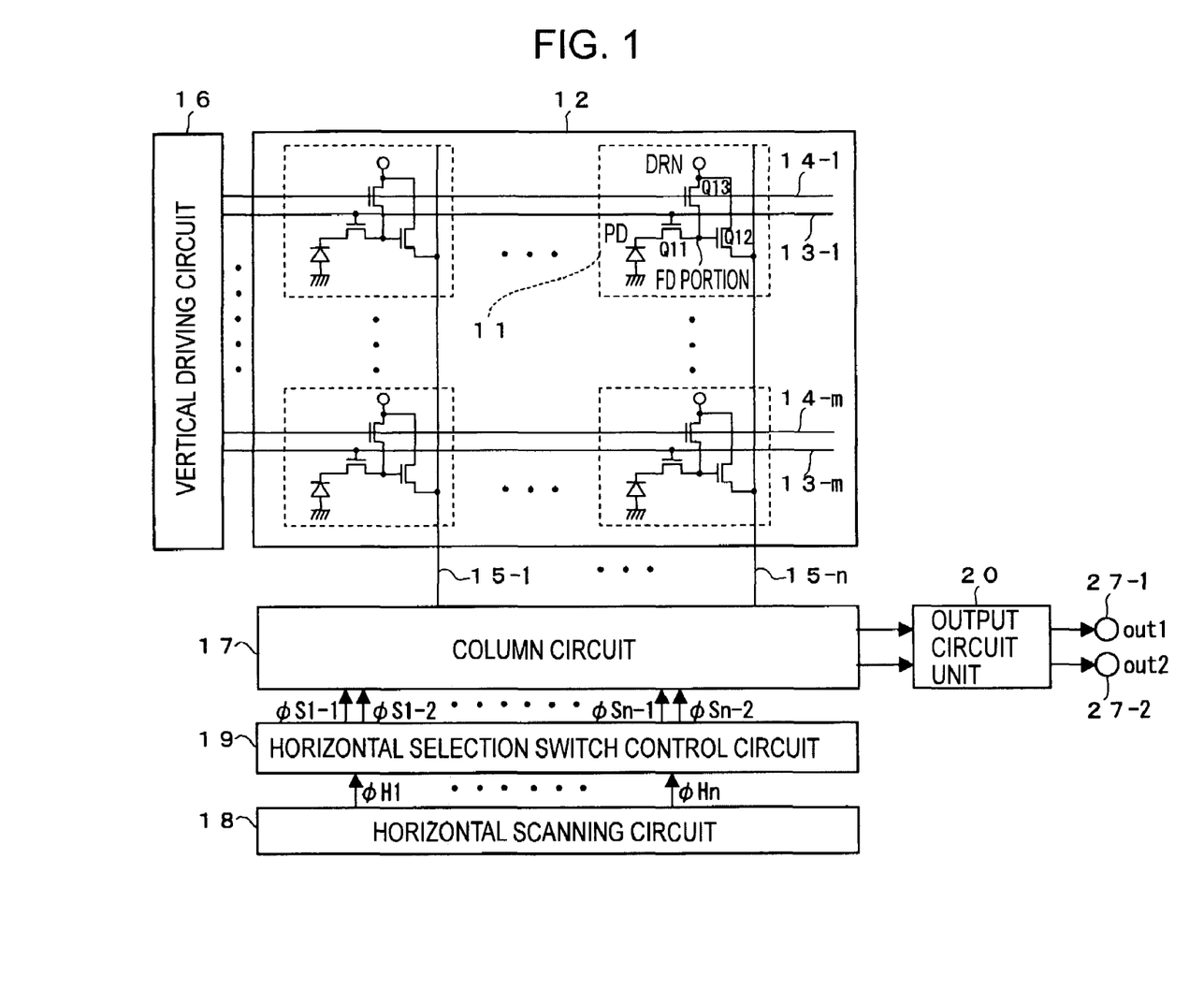
FIG. 1 is a schematic diagram showing a MOS solid-state image pickup device according to an embodiment of the present invention.

FIG. 1 is a schematic diagram showing the structure of a solid-state image pickup device according to an embodiment of the present invention. Here, a case where the present invention is applied to a metal-oxide semiconductor (MOS) solid-state image pickup device will be described.

Referring to FIG. 1, pixels (pixel circuits) 11 each include a photoelectric conversion portion, for example, a photo-diode PD. A pixel array area 12 includes m row×n column pixels arranged in a two-dimensional array. In the pixel array area 12, with respect to the matrix arrangement of the pixels 11, transfer control lines 13-1 to 13-$m$ and reset control lines 14-1 to 14-$m$ are provided for corresponding rows, and vertical signal lines 15-1 to 15-$n$ are provided for corresponding columns. Each of the pixels 11 has an arrangement having three transistors. Each of the pixels 11 includes, for example, a transfer transistor Q11, an amplifier transistor Q12, and a reset transistor Q13, in addition to the photo-diode PD. The transfer transistor Q11, the amplifier transistor Q12, and the reset transistor Q13 are, for example, N-channel MOS transistors.

In each of the pixels (pixel circuits) 11, the anode of the photo-diode PD is grounded. The source of the transfer transistor Q11 is connected to the cathode of the photo-diode PD, the drain of the transfer transistor Q11 is connected to a floating diffusion (FD) portion, and the gate of the transfer transistor Q11 is connected to the corresponding transfer control lines 13-1 to 13-*m*. Accordingly, the transfer transistor Q11 transfers a signal charge (photoelectron) obtained by photoelectric conversion in the photo-diode PD to the FD portion. Here, the FD portion is a diffusion layer having a parasitic capacitance. The gate of the amplifier transistor Q12 is connected to the FD portion, the drain of the amplifier transistor Q12 is connected to a drain potential DRN, and the source of the amplifier transistor Q12 is connected to the corresponding vertical signal lines 15-1 to 15-*n*. Accordingly, the amplifier transistor Q12 outputs a signal (reset level/signal level) corresponding to the potential of the FD portion to the corresponding vertical signal lines 15-1 to 15-*n*. The source of the reset transistor Q13 is connected to the FD portion, the drain of the reset transistor Q13 is connected to the drain potential DRN, and the gate of the reset transistor Q13 is connected to the corresponding reset control lines 14-1 to 14-*m*. Accordingly, the reset transistor Q13 resets the potential of the FD portion to the drain potential DRN.

Although an example of the arrangement of each of the pixels (pixel circuits) 11 having three transistors is described here, the arrangement is not limited to this. For example, each of the pixels (pixel circuits) 11 may have an arrangement having four transistors including, for example, a selection transistor for selecting a pixel.

A vertical driving circuit 16, a column circuit 17 functioning as signal processing means, a horizontal scanning circuit 18 and a horizontal selection switch control circuit 19 functioning as a horizontal driving circuit, and an output circuit unit 20 are provided near the pixel array area 12.

The vertical driving circuit 16 includes, for example, shift registers. The vertical driving circuit 16 selects the pixels 11 of the pixel array area 12 for each row, and gives transfer signals TRF via the corresponding transfer control lines 13-1 to 13-*m* and reset signals RST via the corresponding reset control lines 14-1 to 14-*m* to the pixels 11 in the selected row. Here, the pixels 11 are selected for each row by giving a selection signal SEL from the vertical driving circuit 16 to a power supply control circuit (not shown) in synchronization with vertical scanning and, in response to this, by supplying the drain potential DRN to the pixels 11 in the selected row from the power supply control circuit.

Figure 2:
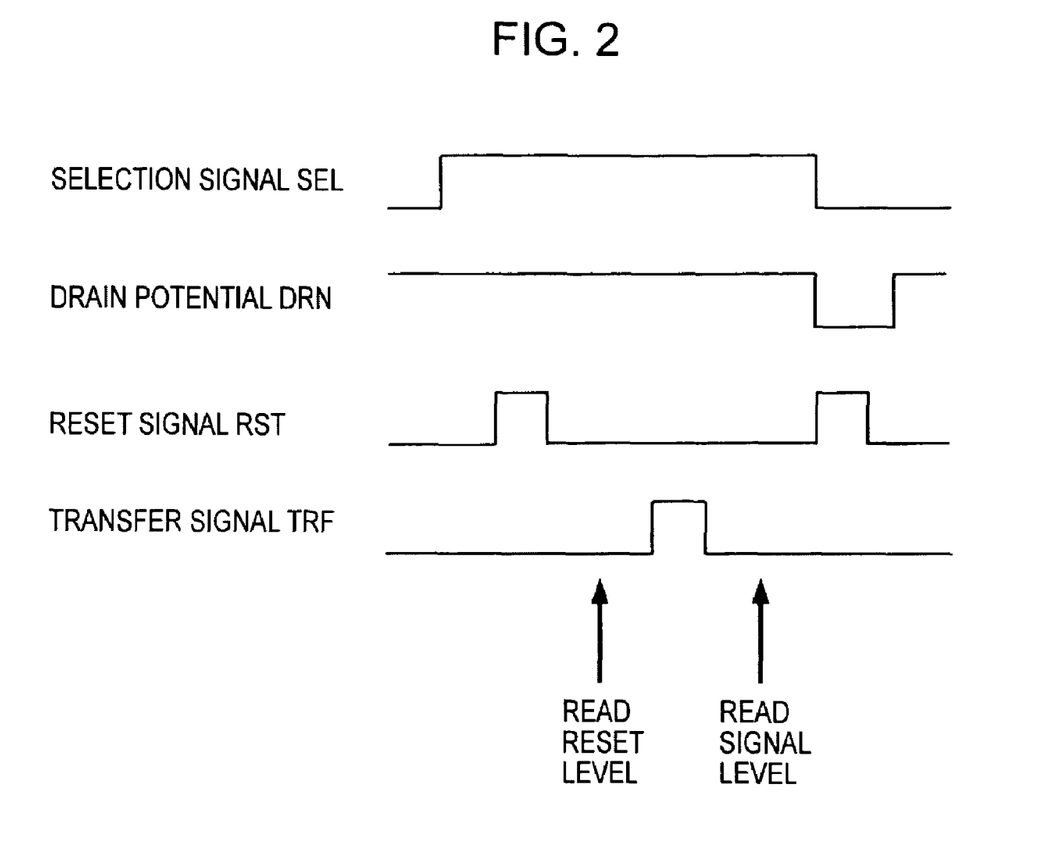
FIG. 2 is a timing chart showing the timing relationship between a selection signal, a drain potential, a reset signal, and a transfer signal.

FIG. 2 shows the timing relationship among the selection signal SEL, the drain potential DRN, the reset signal RST, and the transfer signal TRF. The pixels 11 are selected for each row in accordance with the selection signal SEL. Then, in the selected row, giving the reset signal RST to the pixels 11 causes the potential of the FD portion to be reset to the drain potential DRN, and the reset potential of the FD portion is output as a reset level to the corresponding vertical signal lines 15-1 to 15-*n* via the amplifier transistor Q12. Then, giving the transfer signal TRF to the pixels 11 causes a signal charge that is photo-electrically converted in the photo-diode PD to be transferred to the FD portion, and the transferred potential of the FD portion is output as a signal level to the corresponding vertical signal lines 15-1 to 15-*n* via the amplifier transistor Q12.

Signals taken out from one end of each of the vertical signal lines 15-1 to 15-*n* are supplied to the column circuit 17. The column circuit 17 is a signal processing circuit including, for example, a correlated double sampling (CDS) circuit and a sample-and-hold (S/H) circuit. The column circuit 17 loads a reset level and a signal level output, for example, from the pixels 11 in two selected rows of the pixel array area 12 for each column during a horizontal blanking period and obtains the difference between the levels. Accordingly, the column circuit 17 eliminates fixed pattern noise of the pixels 11 and samples-and-holds electric charges of the pixels in the two rows.

Figure 3:
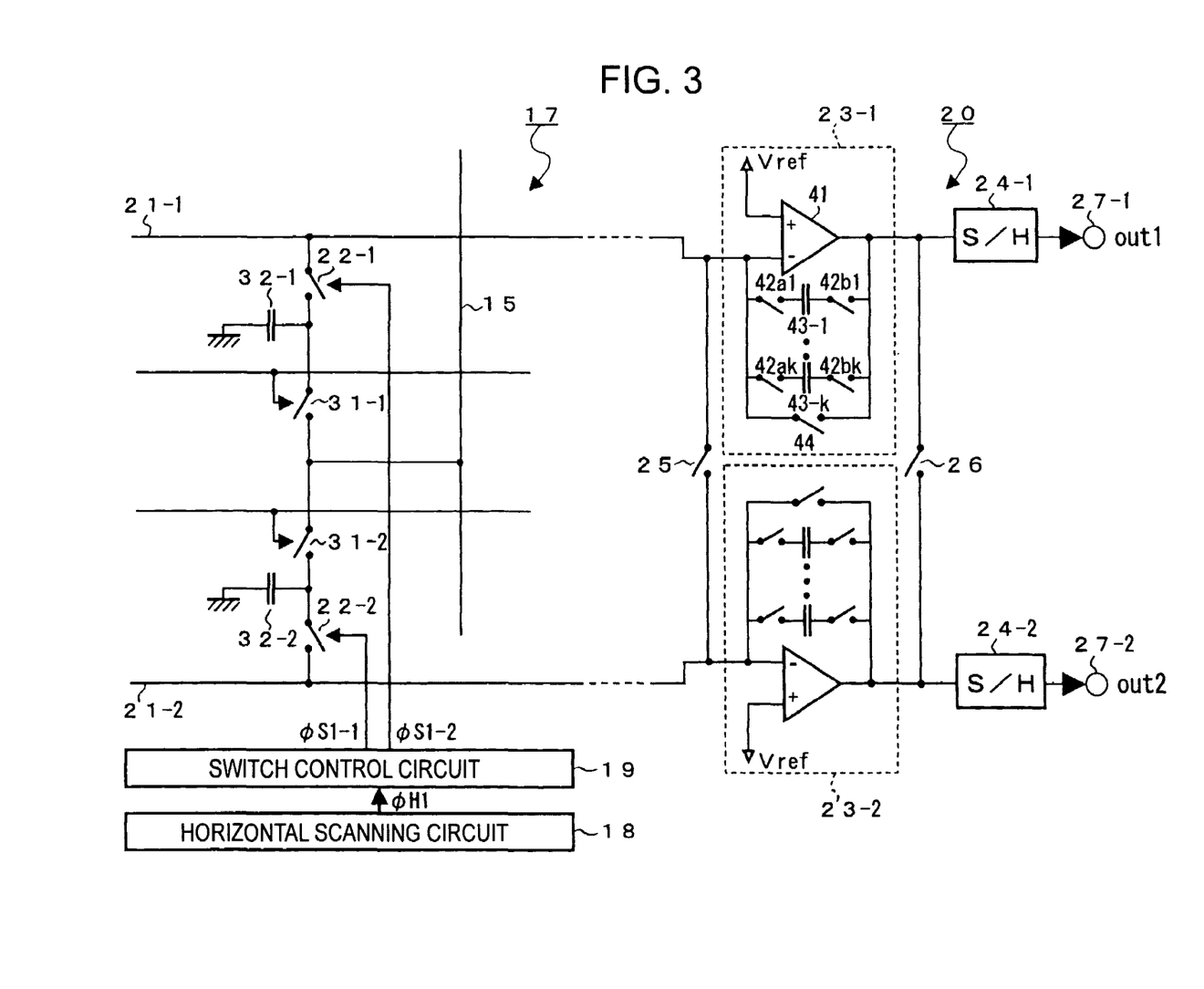
FIG. 3 is a circuit diagram showing an example of the arrangement of an S/H circuit part for a column in a column circuit and the arrangement of an output circuit unit.

FIG. 3 shows an example of the arrangement of the S/H circuit part for a column in the column circuit 17. As is clear from FIG. 3, in order to sample-and-hold dual-rail electric charges that are read from, for example, pixels in two rows of the pixel array area 12 and that are subjected to noise elimination by the CDS circuit, the S/H circuit part for the column in the column circuit 17 has an arrangement including, between the vertical signal line 15 and a reference potential, for example, a ground potential, a sampling switch 31-1 and a capacitor 32-1 connected in series with each other and a sampling switch 31-2 and a capacitor 32-2 connected in series with each other. The sampling switches 31-1 and 31-2 sample signals of the pixels in the two rows supplied through the vertical signal line 15 and store the sampled signals in the capacitors 32-1 and 32-2.

For processing of dual-rail electric charges by the column circuit 17, two horizontal signal lines 21-1 and 21-2 are provided. Also, a horizontal selection switch 22-1 is connected between the horizontal signal line 21-1 and a common connection node N11 of the sampling switch 31-1 and the capacitor 32-1, and a horizontal selection switch 22-2 is connected between the horizontal signal line 21-2 and a common connection node N12 of the sampling switch 31-2 and the capacitor 32-2. The horizontal selection switches 22-1 and 22-2 constitute a horizontal driving circuit, together with the horizontal scanning circuit 18 and the horizontal selection switch control circuit 19.

The horizontal scanning circuit 18 includes, for example, shift registers. The horizontal scanning circuit 18 outputs horizontal scanning pulses φH1 to φHn in order during a horizontal scanning period (effective pixel period). In synchronization with the horizontal scanning pulses φH1 to φHn output in order from the horizontal scanning circuit 18, the horizontal selection switch control circuit 19 sequentially outputs dual-rail switch control pulses φS1-1 and φS1-2 to φSn-1 and φSn-2 and controls driving of the horizontal selection switches 22-1 and 22-2. The horizontal selection switches 22-1 and 22-2 enter an on state (closed state) by receiving the switch control pulses φS1-1 and φS1-2 to φSn-1 and φSn-2. The horizontal selection switches 22-1 and 22-2 supply electric charges stored in the capacitors 32-1 and 32-2 to the output circuit unit 20 via the horizontal signal lines 21-1 and 21-2.

FIG. 3 is a circuit diagram showing an example of the arrangement of the S/H circuit part for a column and the arrangement of the output circuit unit 20.

As is clear from FIG. 3, the output circuit unit 20 includes two output circuits, for example, charge-voltage conversion amplifiers 23-1 and 23-2, provided so as to correspond to the horizontal signal lines 21-1 and 21-2; S/H circuits 24-1 and 24-2 provided at an output side of the charge-voltage conversion amplifiers 23-1 and 23-2; a switch 25 for selectively short-circuiting input terminals of the charge-voltage conversion amplifiers 23-1 and 23-2; and a switch 26 for selectively short-circuiting output terminals of the charge-voltage conversion amplifiers 23-1 and 23-2. Here, the switch 26 is not essential. The reason why the switch 26 is not essential will be described below.

The charge-voltage conversion amplifier 23-1 includes an operational amplifier 41 whose inverting (−) input terminal is connected to an output terminal of the horizontal signal line 21-1 and whose non-inverting (+) input terminal receives a reference voltage Vref; a switch 42*a*, a feedback capacitor 43, and a switch 42*b* connected in series with each other between the inverting input terminal and the output terminal of the operational amplifier 41; and a reset switch 44 connected between the inverting input terminal and the output terminal of the operational amplifier 41. The charge-voltage conversion amplifier 23-1 converts an electric charge supplied via the horizontal signal line 21-1 into a voltage. Here, k (k is an integer equal to 2 or more) switches 42*a*1 to 42*ak*, feedback capacitors 43-1 to 43-*k*, and switches 42*b*1 to 42*bk* are provided so as to set the gain of the charge-voltage conversion amplifier 23-1. The charge-voltage conversion amplifier 23-2 has the same arrangement as the charge-voltage conversion amplifier 23-1.

The S/H circuits 24-1 and 24-2 sample-and-hold data of output signals of the charge-voltage conversion amplifiers 23-1 and 23-2. Hold data (pixel data) of the S/H circuits 24-1 and 24-2 is derived from dual output terminals 27-1 and 27-2 as pixel signals (analog signals) corresponding to electric charges photo-electrically converted at the pixels 11. The switches 25 and 26 are associated with each other. In a driving mode in which pixel addition in the vertical direction is performed and pixel information is read at a low resolution, the switches 25 and 26 enter an on state (closed state) in response to a mode signal for designating the driving mode, and the input terminals of the charge-voltage conversion amplifiers 23-1 and 23-2 and the output terminals of the charge-voltage conversion amplifiers 23-1 and 23-2 are short-circuited.

The charge-voltage conversion principles in the charge-voltage conversion amplifiers 23-1 and 23-2 will be described with reference to FIGS. 4A and 4B. Although the charge-voltage conversion amplifier 23-1 is explained as an example here, the same principle is applied to the charge-voltage conversion amplifier 23-2. Here, Vm represents a potential corresponding to an electric charge stored in a capacitor 32-1*i* in a column i, and Vref represents a reference potential of the charge-voltage conversion amplifier 23-1.

Figure 4A:
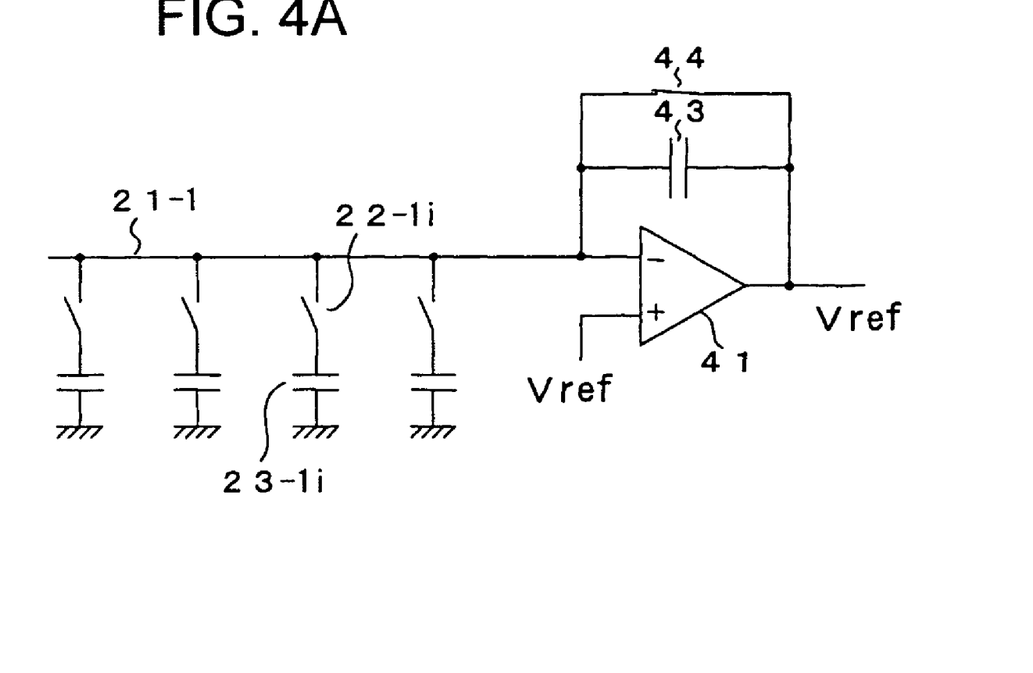
FIG. 4A is an equivalent circuit diagram in a reset phase for explaining the charge-voltage conversion principles in a charge-voltage conversion amplifier.
Figure 5:
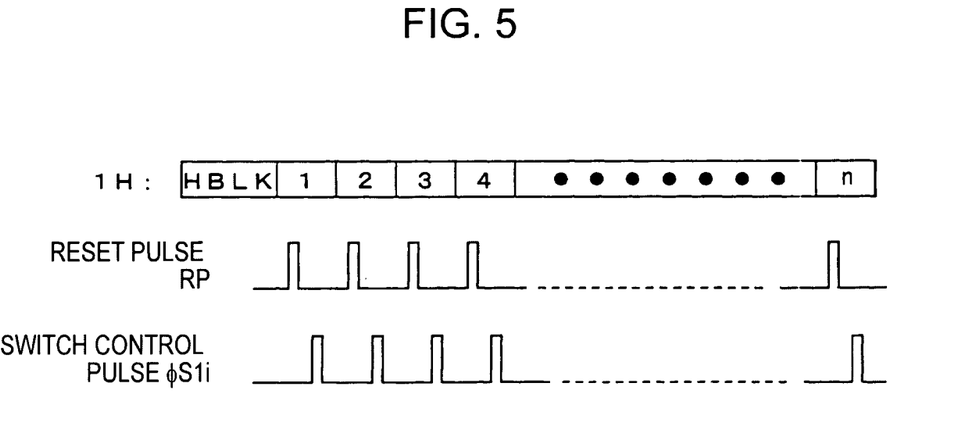
FIG. 5 is a timing chart showing the timing relationship between a reset pulse and a switch control pulse.

Referring to a timing chart shown in FIG. 5, in a reset phase shown in FIG. 4A in which a reset pulse RP is active (high level), when the reset switch 44 is turned on in response to the reset pulse RP, an inverting input terminal and a non-inverting input terminal of the operational amplifier 41 are short-circuited. Thus, since the charge-voltage conversion amplifier 23-1 functions as a voltage follower, the potential of the horizontal signal line 21-1 and the output potential of the charge-voltage conversion amplifier 23-1 become the reference potential Vref. Here, an electric charge Q1 represented by $Q1=Vm \cdot C1$ is stored in the capacitor 32-1*i*, where C1 represents the capacitance of the capacitor 32-1*i*.

Figure 4B:
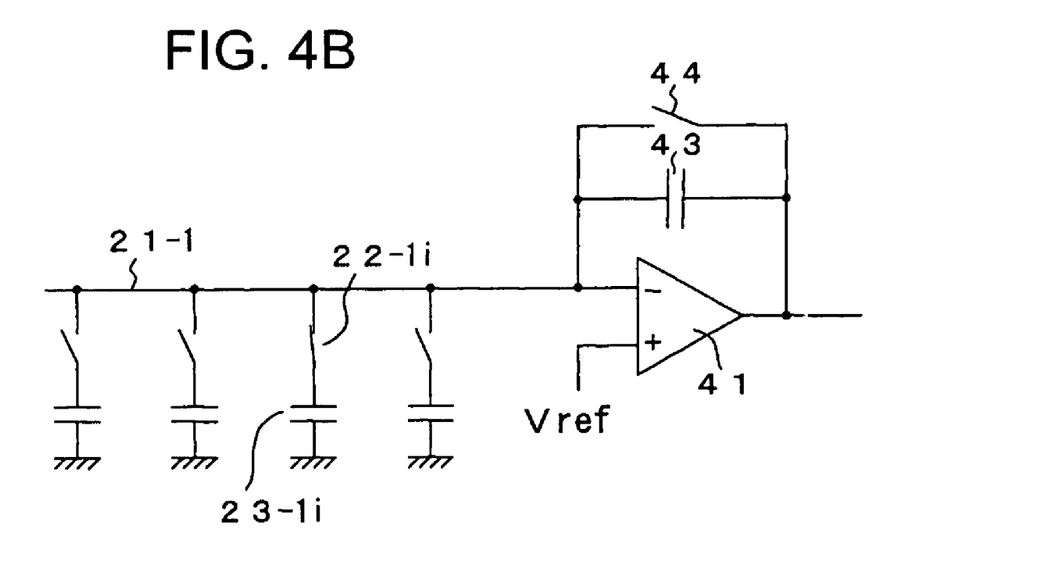
FIG. 4B is an equivalent circuit diagram in a sample phase for explaining the charge-voltage conversion principles in the charge-voltage conversion amplifier.

In a sample phase shown in FIG. 4B in which the reset pulse RP is non-active (low level), the reset switch 44 is turned off, and the horizontal selection switch 22-1*i* is turned on in response to a switch control pulse φSi-1 that is synchronized with the horizontal scanning pulse φH. Thus, the capacitor 32-1*i* is connected to the horizontal signal line 21-1 via the horizontal selection switch 22-1*i*. Here, since the potential of the horizontal signal line 21-1 is held at the reference potential Vref by the charge-voltage conversion amplifier 23-1, the electric charge of the capacitor 32-1*i* is changed from the electric charge Q1 to an electric charge Q2, which is represented by $Q2=Vref \cdot C1$.

The amount of change (the amount of difference) ΔQ (=Q1−Q2) in the electric charge appears at the feedback capacitor 43 of the charge-voltage conversion amplifier 23-1. As a result, the electric charge stored in the capacitor 32-1*i* is converted into a voltage Vout, represented by $Vout=Vref+\{(C1/C2) \cdot (Vref-Vm)\}$, where C2 (the capacitance of any one of the feedback capacitors 43-1 to 43-*k* or a combined capacitance of a plurality of capacitances) represents the capacitance of the feedback capacitor 43.

Referring back to FIG. 3, the solid-state image pickup device according to this embodiment has an arrangement including dual capacitors, that is, the capacitors 32-1 and 32-2, and dual charge-voltage conversion amplifiers, that is, the charge-voltage conversion amplifiers 23-1 and 23-2. Thus, in a case where a driving mode in which pixel information is read at high speed is required, the switches 25 and 26 are turned off and input terminals and output terminals of the charge-voltage conversion amplifiers 23-1 and 23-2, which are output circuits, are not short-circuited so that the dual output circuits are used as dual-rail outputs. Thus, analog pixel signals for two rows can be read from the analog output terminals 27-1 and 27-2 independently and in parallel.

In contrast, in a driving mode in which pixel information is read at a low resolution, pixel addition in the vertical direction can be performed using the same circuits. More specifically, turning on the switch 25 and short-circuiting the input terminals of the charge-voltage conversion amplifiers 23-1 and 23-2 enables addition of two pixels in the vertical direction. Accordingly, when short-circuiting the input terminals of the charge-voltage conversion amplifiers 23-1 and 23-2 causes an offset of each of the dual charge-voltage conversion amplifiers 23-1 and 23-2 to be ignored, basically, with respect to outputs of the charge-voltage conversion amplifiers 23-1 and 23-2, analog image signals for two rows are added for each pixel. Thus, an average, that is, not merely a sum, is obtained, and each output exhibits the same value.

Thus, an averaged pixel signal obtained by pixel addition can be read from either the analog output terminal 27-1 or 27-2. In order to read a pixel signal from either the analog output terminal 27-1 or 27-2, generally, a switch of only one of the S/H circuits 24-1 and 24-2 each formed by the combination of a switch and a capacitor is turned on. Here, since a load viewed from the S/H circuit 24-1 or 24-2 whose switch is turned off is low, this achieves high-speed reading.

Furthermore, by turning on the switch 26 in association with the switch 25 and by short-circuiting the output terminals of the charge-voltage conversion amplifiers 23-1 and 23-2 as well as the input terminals of the charge-voltage conversion amplifiers 23-1 and 23-2, even if offsets are found in the dual charge-voltage conversion amplifiers 23-1 and 23-2, an average in which the offsets are canceled can be output. In other words, by short-circuiting the input terminals of the dual charge-voltage conversion amplifiers 23-1 and 23-2 and by short-circuiting the output terminals of the dual charge-voltage conversion amplifiers 23-1 and 23-2, the two charge-voltage amplifiers function as a large charge-voltage conversion amplifier.

However, even in the driving mode in which pixel information is read at a low resolution, the same average can be read from the analog output terminals 27-1 and 27-2 by turning on switches of the dual S/H circuits 24-1 and 24-2 provided in the subsequent stage of the charge-voltage conversion amplifiers 23-1 and 23-2. Accordingly, if the switches of the dual S/H circuits 24-1 and 24-2 are turned on, the same loads as in the driving mode using dual-rail outputs can be obtained when viewed from the charge-voltage conversion amplifiers 23-1 and 23-2. Thus, there is no need to design an amplifier having different loads in two driving modes. Consequently, an amplifier can be designed easily.

As described above, in a MOS solid-state image pickup device including two capacitors, that is, the capacitors 32-1 and 32-2, storing electric charges of pixels in a plurality of rows, for examples, two rows for each column and two charge-voltage conversion amplifiers, that is, the charge-voltage conversion amplifiers 23-1 and 23-2, outputting analog signals corresponding to the electric charges stored in the capacitors 32-1 and 32-2, the switch 25 for selectively short-circuiting the input terminals of the charge-voltage conversion amplifiers 23-1 and 23-2 is provided, and the switch 26 for selectively short-circuiting the output terminals of the charge-voltage conversion amplifiers 23-1 and 23-2 is preferably provided. Thus, the MOS solid-state image pickup device can be selectively driven in two modes, a first driving mode in which the switches 25 and 26 are in a non-short-circuit state (off state) so that the analog signals are read independently from the charge-voltage conversion amplifiers 23-1 and 23-2 and a second driving mode in which the switches 25 and 26 are in a short-circuit state (on state) so that an average of the analog signals is read from the charge-voltage conversion amplifiers 23-1 and 23-2.

In the first driving mode, the switches 25 and 26 are turned off, and the input terminals and the output terminals of the charge-voltage conversion amplifiers 23-1 and 23-2 enter a non-short-circuit state. Thus, the dual-rail circuits can be used as dual-rail outputs, and analog image signals for two rows can be read from the analog output terminals 27-1 and 27-2 independently and in parallel. Accordingly, by adopting the form of dual-rail outputs, high-speed reading can be realized when pixel information of all pixels is read in a still image mode or the like. However, the dual-rail output form is not necessarily used. A single-rail output form may be adopted by using only one of the dual capacitors 32-1 and 32-2 and using only one of the two charge-voltage conversion amplifiers 23-1 and 23-2.

In contrast, in the second driving mode, the switch 25 is turned on and the input terminals of the charge-voltage conversion amplifiers 23-1 and 23-2 enter a short-circuit state. Thus, analog pixel signals for two rows are added for each pixel, and an average, that is, not merely a sum, can be read. Furthermore, the switch 26 is turned on and the output terminals of the charge-voltage conversion amplifiers 23-1 and 23-2 enter a short-circuit state. Thus, even if offsets are found in the dual charge-voltage conversion amplifiers 23-1 and 23-2, the offsets can be canceled. Therefore, an average not including an offset can be output. Accordingly, by adding two pixels in the vertical direction, reading at a low resolution can be realized.

Although a case where the dual-rail capacitors 32-1 and 32-2 and the dual-rail charge-voltage conversion amplifiers 23-1 and 23-2 are provided is described in the foregoing embodiment, dual-rail capacitors and dual-rail charge-voltage conversion amplifiers are not necessarily used. Three- or more-rail capacitors and three- or more-rail charge-voltage conversion amplifiers may be provided to add three or more pixels in the vertical direction for achieving reading at a lower resolution. In this case, by providing switches between input terminals of f (f is an integer equal to 3 or more) charge-voltage conversion amplifiers 23-1 to 23-f and between output terminals of the f charge-voltage conversion amplifiers 23-1 to 23-f, f-rail outputs can be realized in the first driving mode and addition of f pixels in the vertical direction can be realized in the second driving mode.

Incidentally, although pixel addition only in the vertical direction is described in the foregoing embodiment, a known technology can be applied to pixel addition in the horizontal direction. By activating horizontal scanning pulses φH for a plurality of columns at the same time using the horizontal scanning circuit 18 and by accessing the plurality of columns at the same time when horizontal scanning is performed, information for a plurality of pixels in the horizontal direction (lateral direction) in the horizontal signal lines 21-1 and 21-2 can be added.

Figure 6:
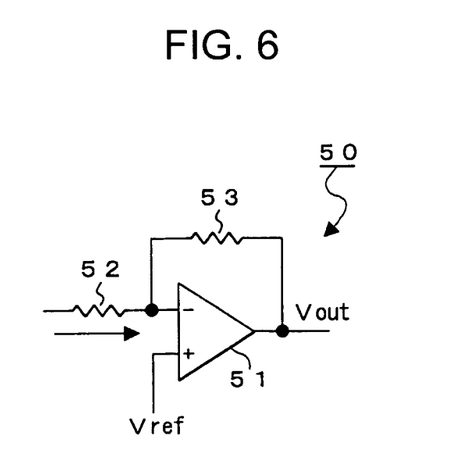
FIG. 6 is a circuit diagram showing an example of the arrangement of a current-voltage conversion amplifier.

Also, a case where the charge-voltage conversion amplifiers 23-1 and 23-2, which convert electric charges into voltages, are used as output circuits that output analog signals corresponding to electric charges stored in the capacitors 32-1 and 32-2 is described in the foregoing embodiment, a charge-voltage conversion amplifier is not necessarily used. For example, as shown in FIG. 6, a current-voltage conversion amplifier 50 including an operational amplifier 51 whose non-inverting input receives the reference voltage Vref, an input resistor 52 connected to an inverting input terminal of the operational amplifier 51, and a feedback resistor 53 connected between an output terminal and the inverting input terminal of the operational amplifier 51 may be used.

In the current-voltage conversion amplifier 50, since a current I corresponding to an electric charge stored in a capacitor flows into the input resistor 52, the output of the operational amplifier 51 exhibits an output voltage Vout represented by Vout=I·R, where R represents the resistance of the feedback resistor 53.

Here, the input resistor 52 is provided for prevention of oscillation, and does not contribute to operation. When current-voltage conversion amplifiers 50 are used as output circuits and input terminals and output terminals are short-circuited in the second driving mode, two feedback resistors 53-1 and 53-2 are connected in parallel to each other, and a combined resistance R/2 is obtained. Thus, if currents corresponding to electric charges stored in the capacitors 32-1 and 32-2 are equal to each other, an output voltage Vout represented by Vout=2I·(R/2)=I·R, which is an average of the sum obtained by adding information of two pixels in the vertical direction, can be obtained.

Although a MOS solid-state image pickup device in which the capacitors 32-1 and 32-2 and the charge-voltage conversion amplifiers 23-1 and 23-2 are provided so as to correspond to the horizontal signal lines 21-1 and 21-2 and in which the charge-voltage conversion amplifiers 23-1 and 23-2 convert electric charges output from the capacitors 32-1 and 32-2 via the horizontal signal lines 21-1 and 21-2 into voltages is described in the foregoing embodiment, the present invention can also be applied to a MOS solid-state image pickup device in which, for example, for the purpose of noise reduction, the capacitors 32-1 and 32-2 and the charge-voltage conversion amplifiers 23-1 and 23-2 are provided for each of the vertical signal lines 15-1 to 15-n and in which electric charges output from the capacitors 32-1 and 32-2 are converted into voltages by the charge-voltage conversion amplifiers 23-1 and 23-2 and output to the horizontal signal lines 21-1 and 21-2.

In this case, only the S/H circuits 24-1 and 24-2 are provided in the horizontal signal lines 21-1 and 21-2. Since the switch 25 is provided between the input terminals of the charge-voltage conversion amplifiers 23-1 and 23-2 for the corresponding vertical signal lines 15-1 to 15-n and the switch 26 is provided between the horizontal signal lines 21-1 and 21-2, the input terminals and the output terminals of the charge-voltage conversion amplifiers 23-1 and 23-2 provided for the corresponding signal lines 15-1 to 15-n can be short-circuited in the second driving mode. Thus, a similar advantage as in the foregoing embodiment can be achieved.

Figure 7:
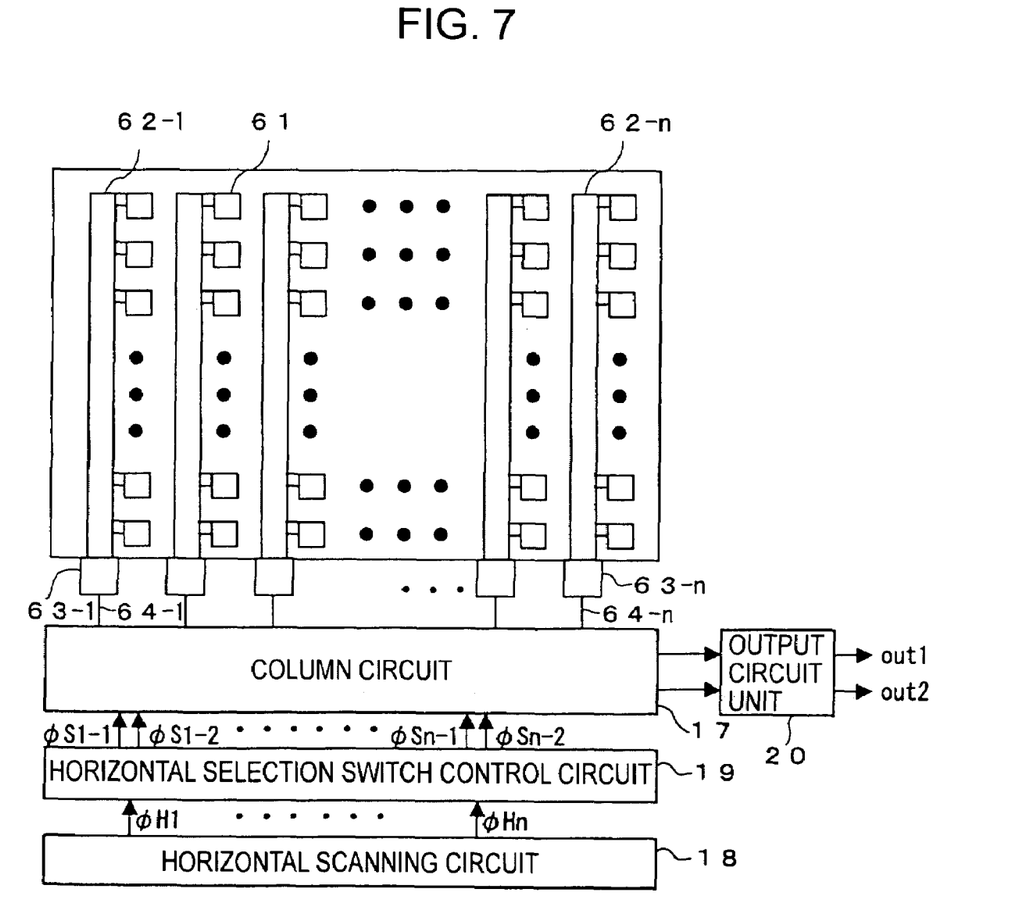
FIG. 7 is a schematic diagram showing a horizontal-scanning CCD solid-state image pickup device according to a modification of the present invention.

In addition, although a case where the present invention is applied to a MOS solid-state image pickup device having a horizontal scanning MOS arrangement in which electric charges obtained by photoelectric conversion for the respective pixels 11 are converted into electric signals, the converted electric signals are read into the respective vertical signal lines 15-1 to 15-*n*, and the read electric signals are output by horizontal scanning is described in the foregoing embodiment, the present invention can also be applied to a horizontal-scanning charge-coupled device (CCD) solid-state image pickup device, as shown in FIG. 7, in which electric charges obtained by photoelectric conversion for respective pixels 61 are vertically transferred by vertical transfer units (vertical CCDs) 62-1 to 62-*n* provided for respective vertical pixel columns, the vertically transferred electric charges are converted into electric signals by electric charge detection units (for example, charge-voltage conversion units) 63-1 to 63-*n* provided in the subsequent stage of the vertical transfer units 62-1 to 62-*n* for respective vertical pixel columns, the converted electric signals are read via vertical signal lines 64-1 to 64-*n*, and the read electric signals are output by horizontal scanning. Here, the column circuit 17, the horizontal scanning circuit 18, the horizontal selection switch control circuit 19, and the output circuit unit 20 shown in FIG. 7 are arranged as in FIG. 1.

Figure 8:
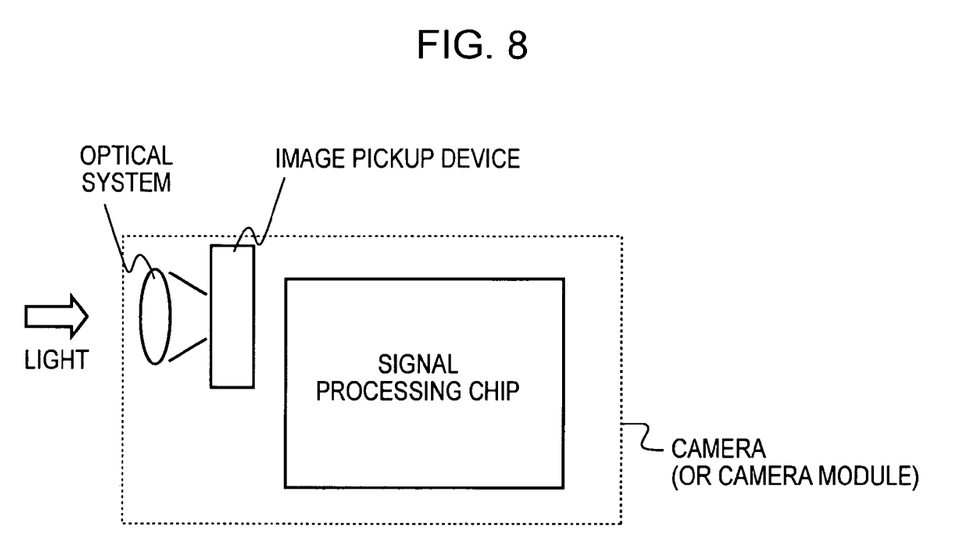
FIG. 8 illustrates the arrangement of a camera (or a camera module) according to another embodiment of the present invention.

As shown in FIG. 8, a solid-state image pickup device according to the present invention may be used as an image pickup device of a camera module, such as a digital still camera, having a still image mode (the first driving mode) and a monitor mode (the second driving mode). In addition, the solid-state image pickup device according to the present invention may be used as an image pickup device of a portable terminal typified by a cellular telephone having a camera functional having a still image mode and a monitor mode.

What is claimed is:

1. A solid-state image pickup device comprising:
a pixel array area in which pixels are two-dimensionally arranged in a matrix, each pixel including a photoelectric conversion portion;
a plurality of capacitors which store electric charges of the pixels in a plurality of rows for each column, the electric charges being output from the pixel array area via a vertical signal line;
a plurality of output circuits to output analog signals corresponding to the electric charges stored in the plurality of capacitors;
first switching means to selectively short-circuit input terminals of the plurality of output circuits; and
second switching means to selectively short-circuit output terminals of the plurality of output circuits,
wherein,
the plurality of capacitors and the plurality of output circuits are provided so as to correspond to a plurality of horizontal signal lines, and the electric charges output from the plurality of capacitors via the plurality of horizontal signal lines are converted into voltages by the plurality of output circuits.

2. The solid-state image pickup device according to claim 1, wherein:
the plurality of capacitors and the plurality of output circuits are provided so as to correspond to a plurality of horizontal signal lines; and
currents corresponding to the electric charges output from the plurality of capacitors via the plurality of horizontal signal lines are converted into voltages by the plurality of output circuits.

3. The solid-state image pickup device according to claim 1, wherein:
the plurality of capacitors and the plurality of output circuits are provided for the vertical signal line; and
the electric charges output from the plurality of capacitors are converted into voltages by the plurality of output circuits and output to a plurality of horizontal signal lines.

4. A solid-state image pickup device comprising:
a pixel array area in which pixels are two-dimensionally arranged in a matrix, each pixel including a photoelectric conversion portion;
a plurality of capacitors which store electric charges of the pixels in a plurality of rows for each column, the electric charges being output from the pixel array area via a vertical signal line;
a plurality of output circuits configured to output analog signals corresponding to the electric charges stored in the plurality of capacitors;
first switching means to selectively short-circuit input terminals of the plurality of output circuits;
a first driving mode in which the first switching means is not short-circuited so that the analog signals are read independently from the plurality of output circuits; and
a second driving mode in which the first switching means is short-circuited so that an average of the analog signals is read from the plurality of output circuits.

5. The solid-state image pickup device according to claim 4, further comprising second switching means to selectively short-circuit output terminals of the plurality of output circuits in association with the first switching means.

6. A driving method for a solid-state image pickup device including a pixel array area in which pixels are two-dimensionally arranged in a matrix, each pixel including a photoelectric conversion portion; a plurality of capacitors to store electric charges of the pixels in a plurality of rows for each column, the electric charges being output from the pixel array area via a vertical signal line; a plurality of output circuits configured to output analog signals corresponding to the electric charges stored in the plurality of capacitors; and first switching means to selectively short-circuit input terminals of the plurality of output circuits, the method comprising:
causing the first switching means to be in a non-short-circuit state so that the analog signals are read independently from the plurality of output circuits.

7. The driving method for the solid-state image pickup device according to claim 6, the method further comprising:
second switching means to selectively short-circuit output terminals of the plurality of output circuits in association with the first switching means.

8. The driving method for the solid-state image pickup device according to claim 6, wherein the analog signals are read from one of the plurality of output circuits.

9. The driving method for the solid-state image pickup device according to claim 6, wherein the analog signals are read from the plurality of output circuits in parallel.

10. A driving method for a solid-state image pickup device including a pixel array area in which pixels are two-dimensionally arranged in a matrix, the each pixel including a photoelectric conversion portion; a plurality of capacitors which store electric charges of the pixels in a plurality of rows for each column, the electric charges being output from the pixel array area via a vertical signal line; a plurality of output circuits configured to output analog signals corresponding to the electric charges stored in the plurality of capacitors; and first switching means to selectively short-circuit input terminals of the plurality of output circuits, the method comprising:
causing the first switching means to be in a short-circuit state so that an average of the analog signals is read from the plurality of output circuits; and second switching means to selectively short-circuit output terminals of the plurality of output circuits in association with the first switching means.

11. The driving method for the solid-state image pickup device according to claim 10, wherein the average is read from all the plurality of output circuits.

12. The driving method for the solid-state image pickup device according to claim 10, wherein the average is read from one of the plurality of output circuits and an output side of the other output circuit is blocked.

13. A driving method for a solid-state image pickup device including a pixel array area in which pixels are two-dimensionally arranged in a matrix, each pixel including a photoelectric conversion portion; a plurality of capacitors which store electric charges of the pixels in a plurality of rows for each column, the electric charges being output from the pixel array area via a vertical signal line; a plurality of output circuits configured to output analog signals corresponding to the electric charges stored in the plurality of capacitors; and first switching means to selectively short-circuit input terminals of the plurality of output circuits, the method comprising:

selectively driving the solid-state image pickup device in a first driving mode in which the first switching means is not short-circuited so that the analog signals are read independently from the plurality of output circuits and in a second driving mode in which the first switching means is short-circuited so that an average of the analog signals is read from the plurality of output circuits.

14. The driving method for the solid-state image pickup device according to claim 13, wherein the solid-state image pickup device further includes second switching means to selectively short-circuit output terminals of the plurality of output circuits in association with the first switching means.

15. The driving method for the solid-state image pickup device according to claim 13, wherein the analog signals are read from one of the plurality of output circuits in the first driving mode.

16. The driving method for the solid-state image pickup device according to claim 13, wherein the analog signals are read from the plurality of output circuits in parallel in the first driving mode.

17. The driving method for the solid-state image pickup device according to claim 13, wherein the average is read from all the plurality of output circuits in the second driving mode.

18. The driving method for the solid-state image pickup device according to claim 13, wherein the average is read from one of the plurality of output circuits and an output side of the other output circuit is blocked in the second driving mode.

* * * * *